(No Model.)

L. H. SHERWOOD.
ELECTRIC RAILWAY CONDUIT SYSTEM.

No. 544,391. Patented Aug. 13, 1895.

Witnesses
John C. Shaw
L. R. Northampton

Inventor
Lorenzo H. Sherwood,
By his Attorneys.
C. A. Snow & Co.

UNITED STATES PATENT OFFICE.

LORENZO H. SHERWOOD, OF MOUNT VERNON, NEW YORK.

ELECTRIC-RAILWAY CONDUIT SYSTEM.

SPECIFICATION forming part of Letters Patent No. 544,391, dated August 13, 1895.

Application filed September 7, 1894. Serial No. 522,382. (No model.)

*To all whom it may concern:*

Be it known that I, LORENZO H. SHERWOOD, a citizen of the United States, residing at Mount Vernon, in the county of Westchester and State of New York, have invented a new and useful Electric-Railway Conduit System, of which the following is a specification.

This invention relates to electric-railway conduit systems; and it has for its object to effect certain new and useful improvements in systems of this character, whereby the greatest possible degree of protection will be afforded to the trolley devices and wires, while at the same time providing for a positive and efficient service.

With these and other objects in view, which will readily appear as the nature of the invention is better understood, the same consists in the novel construction, combination, and arrangement of parts, hereinafter more fully described, illustrated, and claimed.

Figure 1:
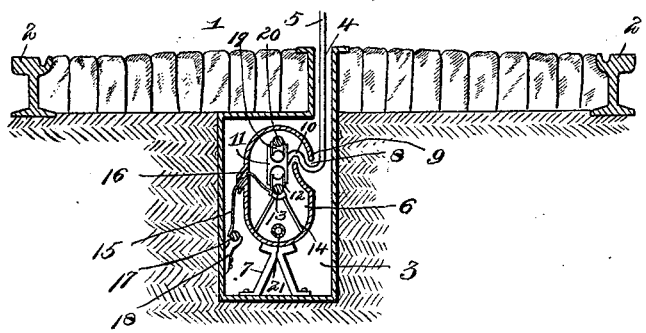
Figure 2:
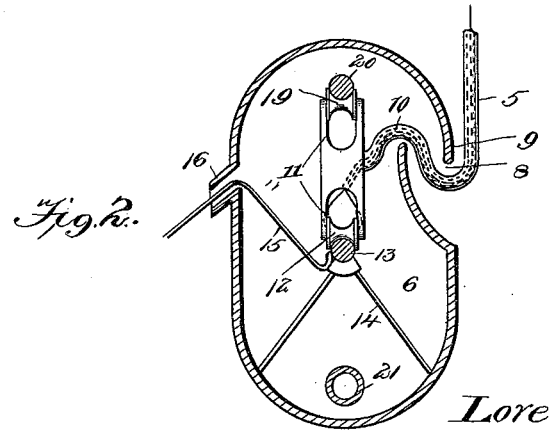

In the accompanying drawings, Figure 1 is a transverse sectional view of the road-bed of a single-track railway equipped with the herein-described conduit system. Fig. 2 is an enlarged detail sectional view of the secondary conduit, including the parts of the system that are accommodated therein.

Referring to the accompanying drawings, 1 designates a railway road-bed intermediate of the usual track-rails 2, and built up in the road-bed below the surface of the ground is the main conduit 3, that is constructed in substantially the same manner as the ordinary conduits for cable and electric railways, and said main conduit 3 is provided at the top with the usual track-slot 4, that extends longitudinally of the track, between the rails thereof, and in the present invention accommodates therein the tubular trolley-arm 5, that is connected with the motor-car in any suitable manner and carries the conductors that lead to the motors of the car.

In the present invention the main conduit 3 accommodates therein a secondary conduit 6. The secondary conduit 6 extends longitudinally through the main conduit 3, and is constructed, preferably, in sections of insulating material or of metal lined with suitable insulation; and said secondary conduit 6 is preferably supported above the bottom of the main conduit 3, within the latter, on suitable supporting-chairs 7, arranged at intervals within the main conduit and secured to the bottom thereof to form rests on which the secondary conduit may be secured. The secondary conduit 6 is entirely inclosed at the top and bottom, to exclude as much moisture as possible, and at one side the said secondary conduit is provided with a side slot 8, that is overhung by the curved lip 9, formed by the top portion of the conduit, and overhanging one side thereof, so as to cover the side slot 8 at the top, whereby moisture is prevented from directly passing into the secondary conduit through the said side slot. The said side slot 8 of the secondary conduit freely accommodates therein the compoundly-curved bracket-arm 10, formed at the lower end of the trolley-arm 5, and the said bracket-arm 10 extends into the secondary conduit and is provided with duplicate upper and lower bearing-frames 11, in the lower of which is journaled an ordinary trolley-wheel 12, that has the ordinary circuit connections therewith that are inclosed within the arm 5. The said trolley-wheel 12 travels over the service-wire 13, that is supported longitudinally within the secondary conduit, above the bottom thereof, by means of a suitable support 14, and at the proper points the service-wire has connected thereto a branch wire 15, which is passed through a downwardly-inclined wire-tube 16, connected to one side of the secondary conduit, and is connected at its other end outside of the secondary conduit to the main conductor or feeder 17. The main conductor or feeder 17 is supported and carried within the main conduit 3 on the insulator bracket-arms 18, that are secured within the main conduit, and are arranged at proper intervals, and it will of course be understood that said main conductor or feeder may be located outside of the main conduit, if found desirable, and branch-wire connections made therewith in the same manner as already described.

The upper bearing-frame 11 of the bracket-arm 10 has journaled therein a guide-wheel 19, that travels under a longitudinally-arranged guide-rail 20, supported longitudinally within the top of the secondary conduit to insure the contact of the wheel 12 with the wire 13, and to absolutely prevent the said trolley-wheel from jumping the service-wire at any point.

By reason of the construction described it will be obvious that the greatest degree of protection is afforded to the trolley connections by means of the secondary conduit, and in order to insure the interior of the said secondary conduit being kept perfectly dry and the moisture evaporated therefrom a suitable heater 21 is arranged longitudinally within the bottom portion of the said secondary conduit, and said heater may consist of an electric heating wire or a pipe for steam or hot air, as will be understood.

Changes in the form, proportion, and the minor details of construction may be resorted to without departing from the principle or sacrificing any of the advantages of this invention.

Having described the invention, what is claimed, and desired to be secured by Letters Patent, is—

In a conduit system for electric railways, the combination of the main conduit, a tubular insulated secondary conduit supported within the main conduit entirely out of contact with all of the walls of the main conduit and provided at one side with a slot and with a wire tube, the service wire supported longitudinally within and above the bottom of the secondary conduit, the main conductor supported within the main conduit outside of the secondary conduit, a branch feed wire passed through said wire tube and connecting the service wire with the main conductor, a longitudinal guide rail arranged within the secondary conduit above and parallel with the service wire, and the compoundly curved trolley arm carrying within the secondary conduit a vertically disposed double bearing frame having a lower trolley wheel traveling on top of the service wire and an upper guide wheel traveling beneath and against the guide rail, substantially as set forth.

In testimony that I claim the foregoing as my own I have hereto affixed my signature in the presence of two witnesses.

LORENZO H. SHERWOOD.

Witnesses:
JAMES W. RICH,
CHARLES F. SANGER.